United States Patent [19]

Beach

[11] 4,159,491
[45] Jun. 26, 1979

[54] QUADRABELL CARILLON INSTRUMENT
[75] Inventor: Ronald O. Beach, Doylestown, Pa.
[73] Assignee: Schulmerich Carillons, Inc., Sellersville, Pa.
[21] Appl. No.: 858,995
[22] Filed: Dec. 9, 1977
[51] Int. Cl.² .................. G11B 15/48; G10H 3/04
[52] U.S. Cl. .................. 360/12; 360/74.4; 84/1.28; 179/100.1 C
[58] Field of Search .................. 360/92, 12, 63, 74, 360/78, 93; 84/1.02, 1.28; 179/100.1 C, 100.1 PS

[56] References Cited
U.S. PATENT DOCUMENTS

| 3,109,898 | 11/1963 | Gray | 360/92 |
|---|---|---|---|
| 3,697,084 | 10/1972 | Ban | 360/92 |
| 3,879,758 | 4/1975 | Pyles | 360/92 |

Primary Examiner—Robert S. Tupper
Attorney, Agent, or Firm—Woodcock, Washburn, Kurtz & Mackiewicz

[57] ABSTRACT

A bell instrument for providing a true sound of cast bells, comprising a plurality of bell record modules, each such module being programmable by both automatic means and manual means and having a continuous tape, or other types of magnetic material (floppy disc or drum), encoding of bell music and control means for operating same, the control means for each tape comprising means for playing a predetermined programmed portion of such music and returning the tape to a start position. In a preferred embodiment, a tape module is employed having a multi-track continuous tape, each track having a respective predetermined portion thereof containing encoded signals representing bell music and a respective other portion thereof containing no encoded music, with accompanying means for selecting and playing the music from any one of said tracks and controlling the tape transport from sensed control information or the lack thereof on a given predetermined one of said tracks.

1 Claim, 4 Drawing Figures

QUADRABELL CARILLON INSTRUMENT

BACKGROUND OF THE INVENTION

1. Field of the Invention

This invention lies in the field of bell music instruments and, more particularly, bell music instruments utilizing recording cast bell music on continuous tapes.

2. Description of the Prior Art

The use of bells in church liturgy and other environments has roots which go back for many centuries. The special grace and resonance of cast bells has a particular attraction, and derives from the basic property of the metal-on-metal sound of such bells. While the tradition of metal bells lives on in the present world, modern economics makes true cast bell systems out of reach for all but relatively few churches and institutions. While certain traditional bell ringing can be accomplished with one or a limited number of large cast bells, the use of a large set of real cast bells is enormously expensive. However, bell music remains distinctive and very much in demand not only for churches, but other institutions such as universities and memorial parks, as well as commercial enterprises such as banks, shopping malls and the like. For many of these institutions, there is not only a great demand for bell systems, but there is a demand for highly flexible systems which can provide a wide variety of programmable bell music and which are economically available.

SUMMARY OF THE INVENTION

It is an object of this invention to provide a relatively inexpensive and highly flexible bell instrument which captures and makes available the true sound of cast bells, which instrument contains the programming flexibility required by modern demands.

It is another object of this invention to provide a bell instrument which is programmable to meet various different liturgical requirements.

It is another object of this invention to provide a highly flexible programmable bell instrument for providing music having the true sound of cast bells, which music can be controlled by interchangeable automatic and manual programming means, and which is adapted for easy and efficient reprogramming.

It is a further object of this invention to provide a bell music instrument comprising both a standard liturgical bell music package and a more readily programmable package of other selected bell music.

It is yet another object of this invention to provide a bell music instrument comprising a plurality of modules providing bell music, one of said modules providing Westminster chimes which are programmable and are maintained automatically synchronized with real time, in combination with other modules programmable to provide other selected bell music.

In accordance with the above objectives, there is provided a bell music instrument which captures and provides the true sound of cast bells, and which is not a rod-type instrument of a synthesizer. The instrument of this invention comprises a plurality of bell music record modules, each such module being adapted to be controlled by corresponding automatic means for programming the playing of music from such module, in combination with manual means for playing such music. Each module incorporates a continuous tape and associated means for controlling the operation of such, at least one of the modules having a plurality of tracks, each track having a respective music selection recorded thereon, the control means providing for the playing of music from a selected track while controlling the repositioning of the tape to its starting position by the detection and utilization of encoded control information or absence of recorded signals on a sole given one of the plurality of tracks.

DESCRIPTION OF THE PREFERRED EMBODIMENT

Figure 1:
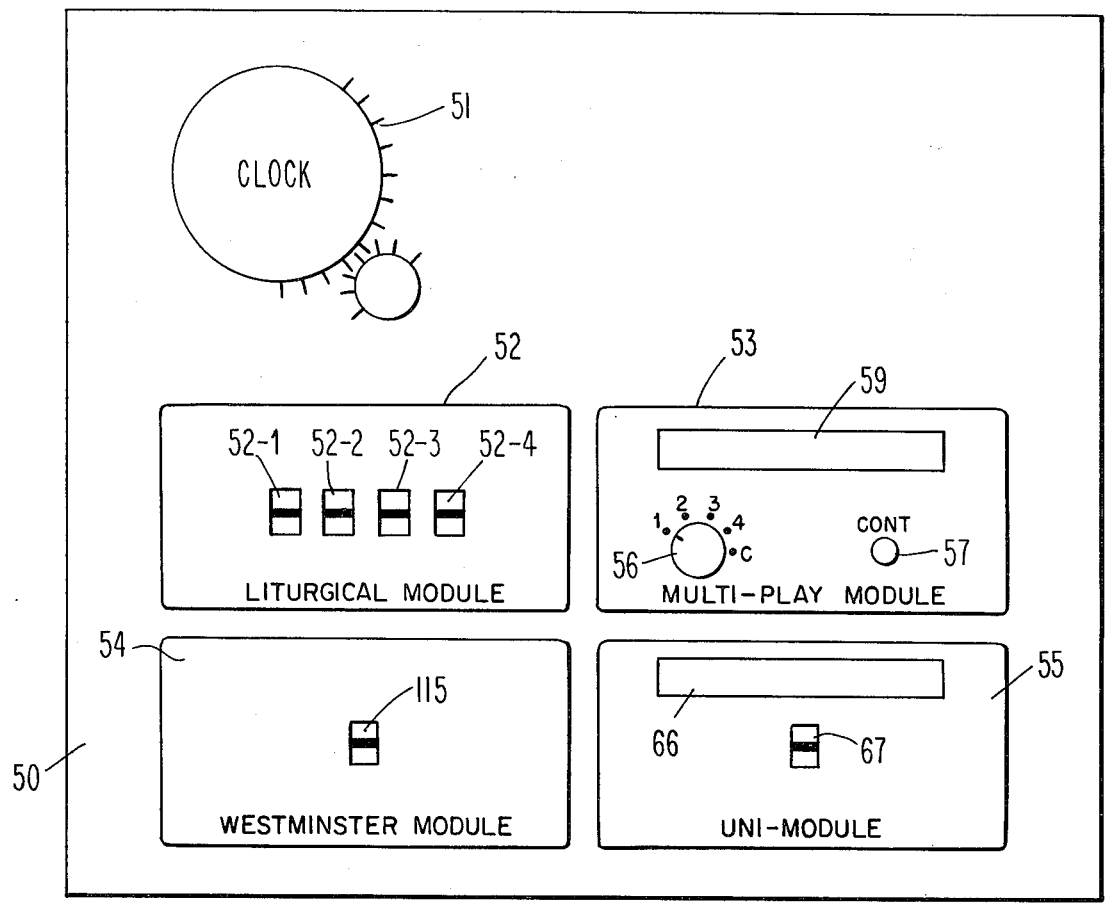
FIG. 1 is a schematic representation of the front panel of the bell music instrument of this invention, showing the automatic and manual means for programming the plurality of bell music modules.

Referring to FIG. 1, there is illustrated the front panel of the quadrabell multiple track instrument of this invention. An automatic clock 51 is shown diagrammatically, the clock comprising pins or other suitable means for programming the playing of bell music on selected tracks or modules. The clock means is a prior art device, and provides programmed electrical switching to energize the instrument for the playing of a plurality of different bell recordings at respective different times of the day or week. In the preferred embodiment, the clock provides for the programming of six different tape tracks, but any number of such tape tracks may be provided for in accordance with the invention. The interfacing of the clock control signals with the respective tracks of the instrument is shown in detail in FIG. 4.

Still referring to FIG. 1, it is seen that there are four different module panels provided with the preferred embodiment. These modules are designated as the liturgical module 52, the multi-play module 53, the Westminster module 43, and the uni-module 55. Each of these modules contains a tape deck and associated tape drive means of conventional design, and audio control circuitry. Modules 53 and 55 are shown with tape openings 59 and 66 respectively, for inserting a bell music tape into the instrument for playing. Modules 52 and 54 are designed so that the bell ringing tape is inserted from behind, for more-or-less permanent use, and thus the tape opening is not seen in the diagram of the front panel. Liturgical module 52 comprises a tape having four tracks of recorded swinging bells, the tape being operated in a continuous manner. The selection of one of the four tracks may be made either through the clock 51 and its programming means, or by one of the four switches 52-1 through 52-4, which switches are illustrated at panel 52. Automatic or manual selection of a specified one of the multiple tracks of the liturgical module results in amplification of the pick-up of only the selected track, while the signals picked up from the other non-selected tracks are suppressed. The closed loop tape means is programmed to transport the tape through one complete loop, no matter which track has been selected, by means which are described further in detail hereinbelow.

The liturgical module 52 is a unique quadra memory module which, in the preferred embodiment, contains four separate liturgical cast bell programs on the four different tape tracks. Any of these programs can be automatically cued or programmed to ring out at a specified time. The quadrabell module can be programmed to perform for a day, for a week or longer, and automatically performs continuously after the initial program. By way of example, the liturgical module for a Protestant church suitable consists of swinging bells for the call to worship, Sunday School, wedding bells and the funeral toll, all of these being permanently built into the liturgical module. For the Catholic Church quadrabell, the module contains the Angelus, week day Mass, Sunday Mass and the tolling bell, likewise all permanently built in. As another variation suitable for a university or commercial environment, the liturgical module may contain other desired selections.

Module 53, designated the multi-play module, comprises a single track tape which is inserted through opening 59, so that it is in position to be played by energization of a conventional closed loop tape transport system (not shown). The multi-play module permits automatic programming of up to 12 bell music selections. For example, hymns, carols, classics, seasonal music, or patriotic selections, can all be programmed on this one versatile module. The multi-play module likewise can be activated either by the clock-timer or operated manually. Associated circuitry is provided, as shown by knob 56 on the panel, for selecting a plurality of the recorded pieces on the tape, each of such pieces being separated by silence or some other predetermined designation to indicate the separation of the individual pieces. Alternately, the module may be placed on continuous play, in which even the CONT light 57 is energized. Where other than continuous play is called for, the circuitry associated with this module counts the number of intervals between discrete music selections, as determined by the detection of a predetermined period of silence on a piece of conductive material of a predetermined shape on the tape, or other means, and following such determination of the predetermined count than transports the tape back to the starting position.

The Westminster module, shown at panel 54 of FIG. 1, comprises a tape with suitable tape transport means for playing the Westminster chimes on the quarter hour, half hour, three quarter hour and hour, and striking the hour with the sound of fine English tuned cast bells. The Westminster chime can be programmed to ring only at specific times, and on specific days as desired. As will be described more fully in connection with FIG. 4, the movement of the tape from which the Westminster chimes are played is continuously synchronized with the instrument clock by a pulse every 15 minutes, 24 hours per day, and is also calendered for omission of days, so that it is always in the proper position even though the chimes may not be programmed for playing over certain selected periods of time. The switch 115 is provided for synchronizing the position of the tape with respect to the clock, in the event that a power failure has caused loss of real time synchronization.

The fourth module 55 is termed a uni-module, and is utilized to provide interchangeable bell music cartridges which provide a great deal of programming flexibility. This module, having an input port 66 for inserting a tape cartridge, allows the user to program single bell music selections such as taps, tolls, special hymns, melodies, alma mater, etc., for specific special occasions. A switch 67 is provided for manual operation of the tape and/or clock operation.

Figure 2:
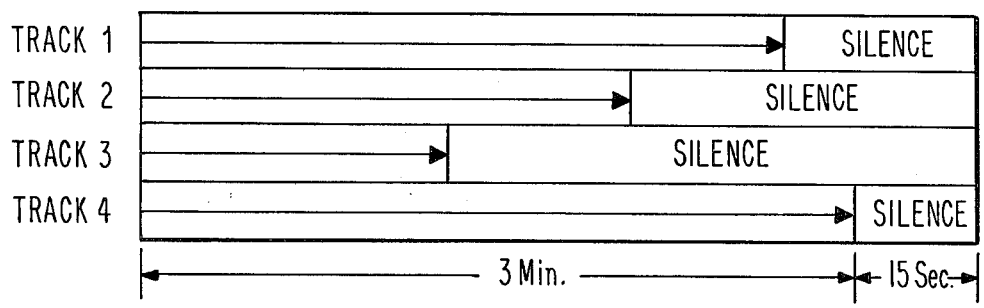
FIG. 2 is a schematic representation of the arrangement of music on a multi-track closed tape module as used in the instrument of this invention.

Referring now to FIG. 2, there is a schematic diagram showing the organization of bell music on the different tracks for a 4 track tape as exemplary for the liturgical module. In this illustration, the bells which are recorded on the 4 tracks extends for different times for each track. The longest programmed bell music is recorded on track 4, in this case illustrated as 3 minutes. The 3 minute music is followed by about 15 seconds of silence, this being a predetermined amount which will be looked for by a silence sensing circuit. In practice, the silence sensing circuit produces an output control signal after sensing silence for a time period less than 15 seconds, e.g., 12 seconds, at which time the cartridge is stopped from further movement. At the next startup, for whatever track is selected, the music will commence approximately 3 seconds after startup. The multi-track tape is organized so that the length of the closed loop is defined by the longest music period plus the predetermined silence time. For convenience, track 4 is used to hold such longest music period. It is understood, of course, if the music period of track 4 lasts longer or shorter than the 3 minutes used as an example, then the length of the tape will be correspondingly longer or shorter. For each other track having a music period of lesser duration, there is a correspondingly longer silence period. Whatever track is played, the tape is continuously rotated around its closed loop until the silence period of track 4 is sensed, such that the tape is always stopped at the same homed position no matter what track has been selected for playing.

Figure 3:
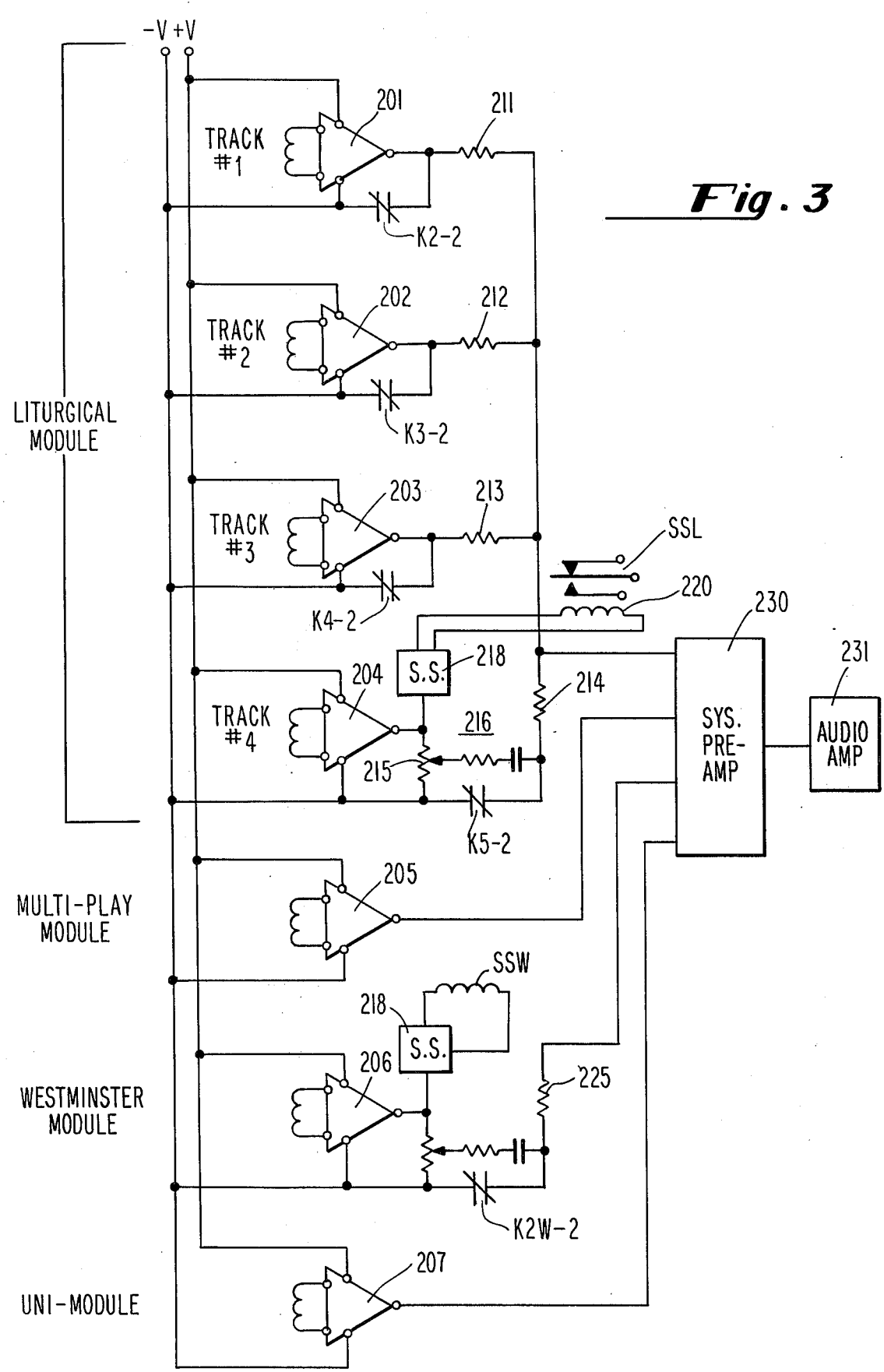
FIG. 3 is a schematic diagram of the sound amplification system as used in the instrument of this invention.

Referring now to FIG. 3, there is seen a circuit diagram showing the amplifier paths for the 7 track channels of the preferred embodiment, i.e., 4 tracks for the liturgical module, and one track each for the other 3 modules. The outputs of all 7 track paths are connected to a system preamp circuit 230, which in turn provides an output to the final audio amplifier 231. In the preferred embodiment, the cast bell sounds from the recordings are then amplified (with harmonic distortion of less than 2%) to power horns for outdoor auditioning.

Referring to the 4 tracks referenced as comprising the liturgical module, it is seen that each track has a track pickup, such pickups being designated as track #1 through track #4. The respective pickups are inputted into preamplifiers 201, 202, 203 and 204 respectively. The outputs of amplifiers 201–203, corresponding to tracks 1–3, are normally shorted by normally closed relay contacts K2-2, K3-2, and K4-2 respectively. When and only a track's corresponding shorting circuit is opened by the opening of its relay contacts, is an output signal provided for delivery to the system preamp. The outputs are connected through respective resistors 211, 212, 213 to the input of the system preamp 230. The arrangement for track #4 is different, for the reason that this track must also search for the sensed silence period. The output of preamp 204 of track 4 is connected to a silence sensing circuit 218, of conventional design, which outputs to a relay coil 220 for operation of relay contacts SSL. The normally closed contacts SSL are incorporated into the control circuit, as will be seen in FIG. 4, and when the silence period on track 4, but only track 4, is detected, contacts SSL open, thereby providing for termination of tape transport.

The output of preamp amplifier 204 is also connected across load resistor 215, having a variable contact which is connected to the resistor-capacitor combination 216, across which the normally closed shorting contacts K5-2 are placed. The opposite end of RC combination 216 is connected through resistor 214 to the system preamplifier 230. It is to be observed that track 4 operates the same as tracks 1–3 in that it provides an audio output only when its corresponding shorting contacts are opened. However, regardless of the condition of contacts K5-2, the silent sensing circuit 218 always operates, such that the tape movement is controlled to stop upon the sensing of the silence period at the end of track 4, and only the end of track 4, no matter what track has been selected for audio output.

The amplifier path of the multi-play module is shown in simplified form, comprising a pickup which feeds into preamplifier 205, the output of which is directly connected through to the system preamplifier 230. It is understood that there is conventional circuitry not shown, connected with the multi-play module, for programming a predetermined number of selections or for continuous play, as desired. The multi-play module likewise has a silence sensing circuit, not shown, which operates in the same manner as shown for track 4 of the liturgical model. The amplifier path of the uni-module, shown with preamplifier 207, is basically the same as for the multi-play module.

The Westminster module has a preamp 206, with its output connected through resistor 225 to the system preamplifier 230. In addition, it has normally closed shorting relay contacts K2W-2 connected between the output and the −V line, providing no output unless such relay contacts are opened, which may be done either manually or by program through the automatic clock control. A silence sensing circuit is also provided.

Figure 4:
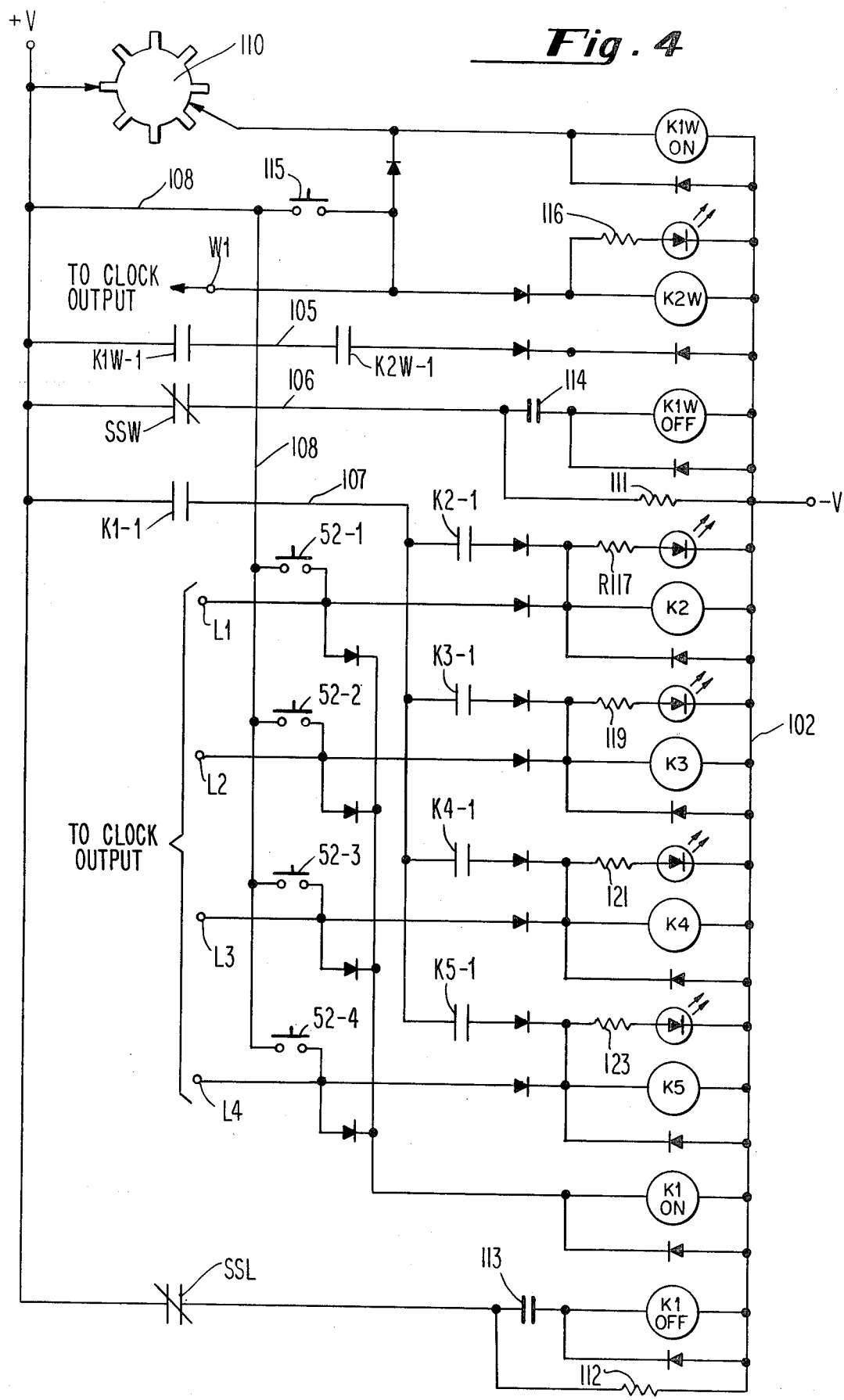
FIG. 4 is a schematic diagram of the control system for controlling the motors which drive the respective tapes as used in this instrument, as well as controlling audio selection.

Referring now to FIG. 4, there is seen a detailed circuit diagram which includes relay control circuits for the Westminster module and the liturgical module. The circuitry for the other two modules is not shown, it being understood that it is equivalent.

A DC source is provided between lines 101 and 102, 101 being maintained at +V with respect to 102 which is at −V. The DC source, not shown, is a power supply of conventional construction and provides an output voltage of sufficient magnitude to operate the relays in the circuit. Between lines 101 and 102 are found a plurality of paths which relate either to the Westminster module or to the liturgical module. The diagram shows a large number of diodes in the various paths, which diodes perform conventional functions in relay switching circuits. The diodes are not numbered and are not discussed hereinafter, their use and function being well understood by those of ordinary skill in this art.

The liturgical module comprises the four paths with lines designated 104, 105, 106 and 109, as well as the sync switch 115 which connects to line 108. Switch 110 is driven at a controlled rate of ¼ revolution per hour, such that contact is made therethrough 4 times each hour, corresponding to the hour, quarter after, half past and quarter of the hour. Each time that switch 110 provides a continuous path therethrough, power is provided across relay K1W ON, which relay when energized controls the running of the tape in the Westminster module. Note that the operation of relay K1W is not dependent upon any programming or manual operation, but that the Westminster tape is driven through a predetermined length each quarter hour, thereby continuously keeping the tape in sync with the clock. However, due to diode 103, energization of relay K1W is not accompanied by energization of K2W, which is the relay which controls amplification of the sound picked up from the Westminster track. Thus, the position of the continuous tape containing the sound track for the Westminster chimes is synchronized independently of the control which permits actual playing of such chimes. The tape movement initiated by switch 110 is terminated by the silence sensing control, as discussed below.

Terminal W1 is connected to the clock output corresponding to the Westminster module, and is accordingly connected to the +V reference at any quarter hour that it is desired to have the chimes play. When +V is placed on terminal W1, relay K2W is energized, and simultaneously relay K1W is energized. As a consequence, contacts K1W-1 and K2W-1 on line 105 are both closed, latching voltage across K2W so that it remains energized. This causes contacts K2W-2 shown in FIG. 3 to remain open, permitting amplification of the audio pickup from the Westminster module track. The K1 ON relay closes self-latching contacts which remain closed, energizing the drive motor until a corresponding K1 OFF relay is energized. Consequently, both K1W-1 and K2W-1 remain closed until the output is detected from the silence sensing circuit connected with the Westminster module. At line 106, normally closed contacts SSW open at the time of the signal from the silence sensing signal, which occurs following each portion of recorded music, or every quarter hour. This causes the charge on capacitor 114 to discharge through resistor 111 and energize the K1W OFF relay, which stops the tape motor and resets the K1W contacts to their initial positions. When this happens, line 105 is opened, and K2W is no longer energized, such that contacts K2W-2 go back to their normally closed position, shorting the output of preamplifier 206.

Referring now to the portion of the diagram of FIG. 4 which relates to the liturgical module, it is seen that there are four relay paths having inputs designated L1, L2, L3, and L4. These inputs are selectively coupled to the automatic clock output, which provides a relative plus voltage in accordance with the programming of the automatic clock 51. Alternately, an input may be provided through any one of switches 52-1 through 52-4, which switches are connected through line 108 to +V. When an input is received corresponding to any one of the tracks, the voltage is placed across relay K2, K3, K4 or K5, as well as across K1 ON. Energization of K1 ON, which is self-latching, causes the liturgical tape transport to operate and also causing the closing of normally open contacts K1-1. At the same time, corresponding to the track which is being energized, one of contacts K2-1 through K5-1 is closed, latching power to relay K2, K3, K4 or K5. By this means, the shorted output corresponding to the selected track, as seen in FIG. 3, is removed, by the opening of the normally closed shorting contacts, allowing the preamplified audio signal to be connected through to the system preamp 230. When the silence period of track 4 is detected, normally closed contacts SSL are opened, causing discharge of the charge on capacitor 113 through the K1 OFF relay, which resets the K1 contacts, shutting off the K1 drive and reopening contacts K1-1. This results in de-energization of the selected relay K2-K5, and the resultant reclosing of the selected shorting contact K2-2 through K5-2.

The multiplay module and uni-module circuits, which are not shown in FIG. 4, have similar latching and unlatching relay control circuits. In addition, priority switching circuitry, not shown, is provided to ensure that only one channel operates at a time. The first channel selected, either by program or manual, has priority to the exclusion of any other channel.

The arrangement of the modules as shown in the drawings and the specification to this point exemplifies a preferred embodiment of the instrument. In addition, the invention comprises an instrument having any number of modules, each module being adapted to comprise a continuous storage system having a plurality of tracks, e.g., any number of tracks such as eight and not just four. In addition to magnetic tape, other types of storage such as discs, drums, and the like may be employed. Thus, this system embraces an instrument having any combination of multiple recording area storage devices associated with the different modules, each module and each storage area of the modules being programmable either through the automatic means or manual means. In turn, each track or storage area may be encoded with different lengths of recorded music, with control signal means on at least one track of the module for providing a signal allowing homing of the continuous tape to a predetermined starting position regardless of the track selected for playing. As used here, such "control signal means" may comprise either encoded data, or the absence of any encoded signals for a predetermined length of the tape track. The automatic programming means may be an automatic clock device as disclosed in the copending application titled "An Improved Program Control Device," Ser. No. 739,609, filed Nov. 8, 1976, now U.S. Pat. No. 4,109,119, and assigned to the same assignee.

In another embodiment, the modules may be adapted to be programmed for timed playing or continuous playing. The timed playing would be accomplished as illustrated above, i.e., the recorded music would play until silence is sensed or any other encoded signal is sensed to turn off the audio until the tape or storage medium is returned to its starting point. For continuous playing, suitably activated by the operator throwing a switch which removes the control of the silence sensing circuit, the recorded music on the selected module plays continuously until the operator switches it off. By this arrangement, the available music is not limited to the time period established by one revolution of the module.

Likewise, in another embodiment, the pins of the automatic clock may be used for switching arrangements in addition to those illustrated herein. For example, for a 6 channel timer, such as illustrated for programming six separate programs, 5 of the pin arrangements on the clock may be used for designating 5 different programs, and the sixth pin may be used as a keying device whereby alternately a first 5 modules, or tracks thereon, would be programmed by the clock and then, after switching caused by the sixth pin, another 5 programs would be controlled by the clock. By this arrangement, one or more pins of the automatic clock may be used as keying devices, to lend further flexibility to the programming feature of this invention.

I claim:

1. A bell music instrument for providing music having the true sound of cast bells, such instrument comprising
    a plurality of bell record modules, each such module comprising a continuous tape system,
    automatic program means for automatically programming the selection and playing of music from a selected one of said bell record modules and,
    manual control means for manually causing the playing of bell music from a selected one of said modules,
    wherein the improvement comprises at least one of said modules having a continuous tape with a plurality of tracks, means for rotating said tape and a track pickup for each track for picking up recorded music therefrom, said track pickups each positioned at a common position relative to said tape, each of said tracks having a sequence of music recorded thereon starting at a common tape starting position, a selected one of said tracks having a predetermined silence period and the other tracks each having a silence period greater than said predetermined period and following their respective sequences of recorded music, means for determining when said pickup means for said selected one track senses the silence of said predetermined silence period, and means for stopping rotation of said tape when a predetermined portion of said predetermined silence period has been sensed.

* * * * *